(12) United States Patent
Furtak

(10) Patent No.: US 9,967,171 B2
(45) Date of Patent: May 8, 2018

(54) COMMUNICATION METHOD AND APPARATUS IN A NETWORK INCLUDING A PLURALITY OF DEVICES

(71) Applicant: Samsung Electronics Co., Ltd., Suwon-si, Gyeonggi-do (KR)

(72) Inventor: Marcin Rafal Furtak, Warsaw (PL)

(73) Assignee: Samsung Electronics Co., Ltd., Suwon-si (KR)

( * ) Notice: Subject to any disclaimer, the term of this patent is extended or adjusted under 35 U.S.C. 154(b) by 78 days.

(21) Appl. No.: 14/672,863

(22) Filed: Mar. 30, 2015

(65) Prior Publication Data

US 2015/0281108 A1 Oct. 1, 2015

(30) Foreign Application Priority Data

Apr. 1, 2014 (KR) ........................ 10-2014-0038748

(51) Int. Cl.
*H04W 72/04* (2009.01)
*H04L 12/729* (2013.01)
*H04L 12/741* (2013.01)

(52) U.S. Cl.
CPC ............ *H04L 45/125* (2013.01); *H04L 45/74* (2013.01)

(58) Field of Classification Search
None
See application file for complete search history.

(56) References Cited

U.S. PATENT DOCUMENTS

| | | | |
|---|---|---|---|
| 8,521,905 B2 | 8/2013 | Beliveau et al. | |
| 2008/0225713 A1* | 9/2008 | Tychon | H04L 45/125 370/231 |
| 2010/0091823 A1* | 4/2010 | Retana | H04L 45/02 375/211 |
| 2010/0271982 A1* | 10/2010 | Baum | H04L 29/12018 370/259 |
| 2011/0047291 A1* | 2/2011 | Ishii | H04L 45/00 709/238 |

(Continued)

FOREIGN PATENT DOCUMENTS

| | | |
|---|---|---|
| KR | 10-2009-0055117 A | 6/2009 |
| KR | 10-2010-0133712 A | 12/2010 |
| KR | 10-1147467 B1 | 5/2012 |
| WO | 2012/023604 A1 | 2/2012 |

OTHER PUBLICATIONS

"Software-Defined Networking: The New Norm for Networks", ONF White Paper, Open Networking Foundation, Apr. 13, 2012, pp. 1-12.

(Continued)

*Primary Examiner* — Brandon Renner
(74) *Attorney, Agent, or Firm* — Jefferson IP Law, LLP

(57) ABSTRACT

A method of communication by a first device is provided. The method includes selecting, by the first device, one path of a plurality of paths to a destination device by each device including the first device within a network, the one path being selected based on information of available links, generating link setting information needed to transmit a packet to the destination device through a second device based on information of a second device included in the selected path, generating a first packet by inserting path information into the packet based on the link setting information, and transmitting the first packet to the destination device through the second device.

16 Claims, 11 Drawing Sheets

(56) References Cited

U.S. PATENT DOCUMENTS

| | | | | |
|---|---|---|---|---|
| 2011/0238975 | A1* | 9/2011 | Amemiya | H04W 4/20 713/150 |
| 2012/0099591 | A1 | 4/2012 | Kotha et al. | |
| 2012/0140697 | A1* | 6/2012 | Chen | H04W 28/06 370/315 |
| 2012/0287791 | A1 | 11/2012 | Xi et al. | |
| 2013/0077501 | A1* | 3/2013 | Krishnaswamy | H04L 47/193 370/252 |
| 2013/0124707 | A1 | 5/2013 | Ananthapadmanabha et al. | |
| 2013/0148667 | A1 | 6/2013 | Hama et al. | |
| 2013/0315102 | A1* | 11/2013 | Kahng | H04L 61/103 370/254 |
| 2013/0318243 | A1 | 11/2013 | Chinthalapati et al. | |
| 2014/0071839 | A1* | 3/2014 | Andersen | H04L 43/0852 370/252 |
| 2014/0185470 | A1* | 7/2014 | Bernath | H04L 65/105 370/252 |
| 2014/0226664 | A1* | 8/2014 | Chen | H04L 61/2589 370/392 |
| 2014/0269289 | A1* | 9/2014 | Effros | H04L 47/38 370/231 |
| 2015/0263959 | A1* | 9/2015 | Patwardhan | H04L 47/193 370/235 |
| 2015/0281367 | A1* | 10/2015 | Nygren | H04L 47/193 709/228 |
| 2016/0212759 | A1* | 7/2016 | Schliwa-Bertling | H04L 69/14 |

OTHER PUBLICATIONS

"OpenFlow Switch Specification", ONF TS-001, Version 1.0.0 (Wire Protocol 0X01), Open Networking Foundation, Dec. 31, 2009, pp. 1-42.

K. L. Calvert et al., "Instrumenting Home Networks", ACM SIGCOMM Computer Communication Review, Jan. 2011, pp. 84-89, vol. 1, No. 1.

S. Sundaresan et al., "BISmark: A Testbed for Deploying Measurements and Applications in Broadband Access Networks", Proceedings of USENIX ATC '14: 2014 USENIX Annual Technical Conference, Jun. 19-20, 2014, pp. 383-394, Philadelphia, USA.

S. Grover et al., "Peeking Behind the NAT: An Empirical Study of Home Networks", ACM, Oct. 23-25, 2013, Barcelona, Spain.

S. Sundaresan et al., "Broadband Internet Performance: A View From the Gateway", SIGCOMM, Aug. 15-19, 2011, pp. 134-145, Toronto, Canada.

A. Ford et al., "TCP Extensions for Multipath Operation with Multiple Addresses draft-ietf-mptcp-multiaddressed-12", IETF Multi Path TCP Workgroup, Oct. 22, 2012, pp. 1-63.

A. Ford et al., "TCP Extensions for Multipath Operation with Multiple Addresses draft-ietf-mptcp-rfc6824bis-04", IETF Multi Path TCP Workgroup, Mar. 7, 2015, pp. 1-67.

A. Ford et al., "Architectural Guidelines for Multipath TCP Development", IETF Multi Path TCP Workgroup, Mar. 2011, pp. 1-28.

M. Scharf et al., "Multipath TCP (MPTCP) Application Interface Considerations", IETF Multi Path TCP Workgroup, Mar. 2013, pp. 1-31.

B. Pfaff, "Open vSwitch", VMware Networking & Security BU.

J. Pettit et al., "Open vSwitch", Linux Collaboration Summit, Apr. 7, 2011.

S. Horman, "An Introduction to Open vSwitch", LinuxCon, Horms Solutions Ltd., Jun. 2, 2011.

B. Pfaff, "Open vSwitch: Past, Present, and Future", VMware NSBU.

"CS 194: Distributed Systems Communication Protocols, RPC", University of California, Berkeley, pp. 1-6.

\* cited by examiner

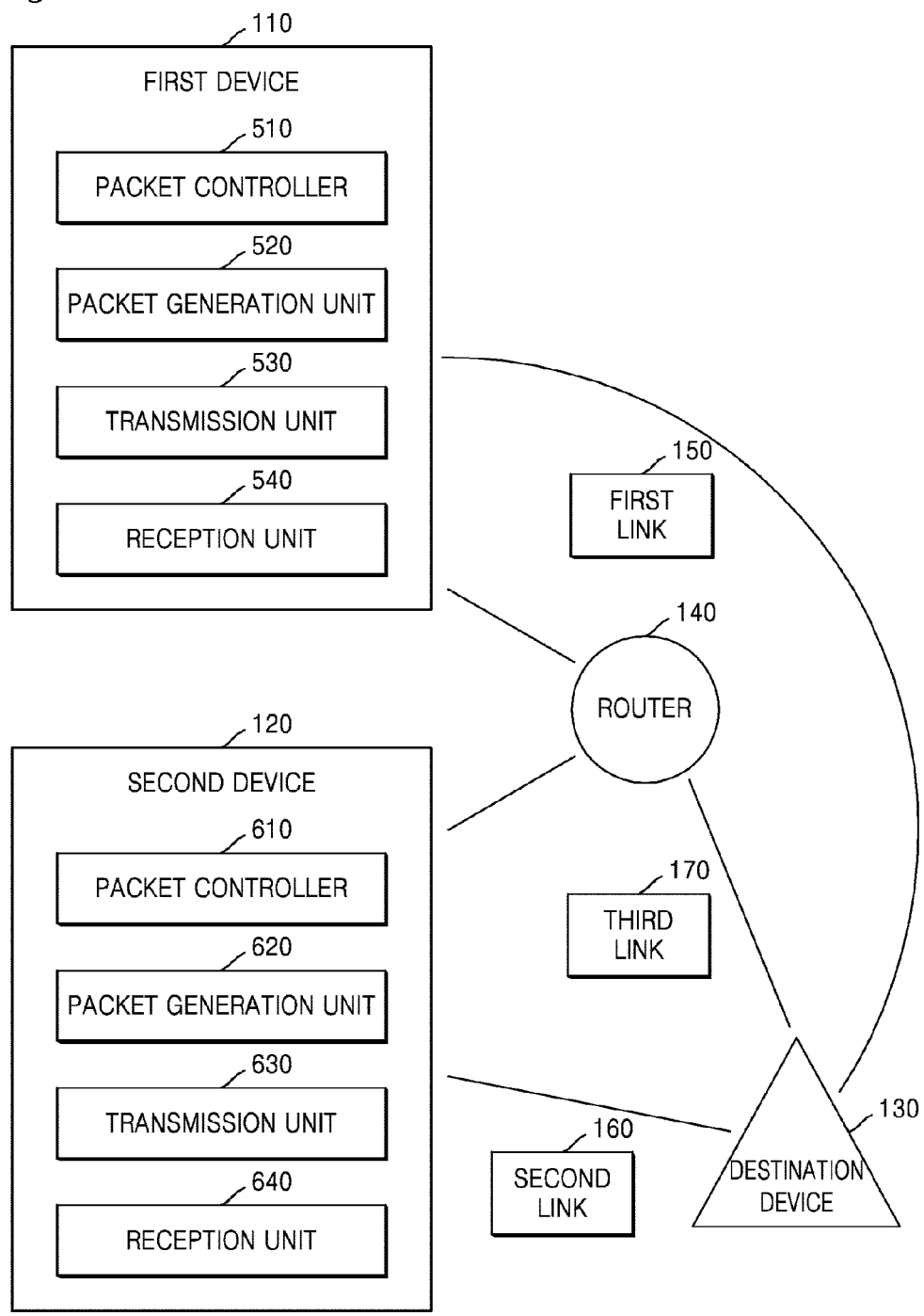

COMMUNICATION METHOD AND APPARATUS IN A NETWORK INCLUDING A PLURALITY OF DEVICES

CROSS-REFERENCE TO RELATED APPLICATION(S)

This application claims the benefit under 35 U.S.C. § 119(a) of a Korean patent application filed on Apr. 1, 2014 in the Korean Intellectual Property Office and assigned Serial number 10-2014-0038748, the entire disclosure of which is hereby incorporated by reference.

TECHNICAL FIELD

The present disclosure relates to a communication method and an apparatus in a network including a plurality of devices. More particularly, the present disclosure relates to a communication method and an apparatus using a software defined networking (SDN) technology in a network including a plurality of devices.

BACKGROUND

In current network technology, all functions related with a network are performed in one device. Furthermore, the same functions which need to be processed only one time are consecutively performed for each device. For example, existing available network devices perform an individual traffic operation for only the links connected to respective devices. As such, the current network is very complicated, is not flexible, increases costs, and when there is a problem in the network, it is difficult to resolve the problem.

In order to resolve such problems, there is a need for a new network structure, and a software defined networking (SDN) structure is being considered as one solution to this problem.

The SDN is a technology, which separates hardware from software and controls the network. Generally, a network device is not controlled by various software sets by separating hardware from software. However, in a network which uses SDN, software which meets the user's needs and environment may be developed or introduced, and thus it is possible for each individual to implement an optimized network environment by selecting only functions which are needed in the network environment.

However, currently available network devices are not SDN compatible, and thus there is a need for a technology of controlling the network by using SDN technology in the network including a device which does not use the SDN technology.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a communication method and an apparatus using a software defined networking technology in a network including a plurality of devices.

In accordance with an aspect of the present disclosure, a method of communication by a first device is provided. The method includes selecting, by the first device, one path of a plurality of paths to a destination device by each device including the first device within a network, the one path being selected based on information of available links, generating link setting information needed to transmit a packet to the destination device through a second device based on information of a second device included in the selected path, generating a first packet by inserting path information into the packet based on the link setting information, and transmitting the first packet to the destination device through the second device.

In accordance with an aspect of the present disclosure, the generating of the link setting information may include generating index information which indicates the link setting information.

In accordance with an aspect of the present disclosure, the generating of the first packet by inserting the path information may include generating a rule for inserting the path information into the packet based on the link setting information and generating the first packet by inserting the path information into the packet according to the generated rule.

In accordance with an aspect of the present disclosure, the generating of the first packet by inserting the path information may include inserting the generated index information into a source port of a packet header of the packet and inserting address information of the second device into a destination port of the packet header of the packet.

In accordance with an aspect of the present disclosure, the selecting may include selecting a path including a quickest link, from among available links by each device within the network, based on information of the available links.

In accordance with an aspect of the present disclosure, a first device which communicates through a second device is provided. The first device includes a first packet controller configured to select one path of a plurality of paths to a destination device by each device including the first device within a network, the one path being selected based on information of available links, and to generate link setting information, which is needed to transmit a packet to the destination device through the second device based on information of the second device included in the selected path, a first packet generation unit configured to generate a first packet by inserting path information into the packet based on the link setting information, and a first transmission unit configured to transmit the first packet to the destination device through the second device.

In accordance with an aspect of the present disclosure, the first packet controller may further generate index information which indicates the link setting information.

In accordance with an aspect of the present disclosure, the first packet controller may further generate a rule for inserting the path information into the packet based on the link setting information, and the first packet generation unit may further generate the first packet by inserting the path information into the packet based on the generated rule.

In accordance with an aspect of the present disclosure, the first packet generation unit may further insert the generated index information into a source port of a packet header of the packet and generate the first packet by inserting address information of the second device into a destination port of the packet header of the packet.

In accordance with an aspect of the present disclosure, the first packet controller may further select the path including a quickest link, from among available links by each device within the network, based on a state of the available links.

In accordance with an aspect of the present disclosure, a method of communication by a second device is provided. The method includes receiving, by the second device, a first packet from a first device, determining whether the received first packet passes through the second device based on path information included in the received first packet, generating a second packet by changing the path information according to link setting information based on a result of the determination, and transmitting the second packet to a destination device.

In accordance with an aspect of the present disclosure, the determining may determine whether index information, which indicates the link setting information, is included in the path information.

In accordance with an aspect of the present disclosure, the generating of the second packet may include generating a rule for changing the path information included in the received first packet, based on the link setting information, and changing the path information included in the received first packet according to the generated rule.

In accordance with an aspect of the present disclosure, the changing of the path information may include inserting target address information into a destination port of the received first packet and inserting address information of the second device into a source port of the received first packet.

In accordance with an aspect of the present disclosure, the method may further include receiving a response packet in response to the transmitted second packet, generating a third packet by changing path information of the response packet based on the link setting information, and transmitting the third packet to the first device.

In accordance with an aspect of the present disclosure, the generating of the third packet may include generating a rule for changing the path information included in the response packet, based on the link setting information, and generating the third packet by changing the path information included in the response packet based on the generated rule.

In accordance with an aspect of the present disclosure, the generating of the third packet may include generating the third packet by inserting address information of the first device into a destination port of the response packet and inserting destination address information of a source port of the response packet.

In accordance with an aspect of the present disclosure, a second device is provided. The second device includes a second reception unit configured to receive a first packet from a first device, a second packet controller configured to determine whether the received first packet passes through the second device based on path information included in the received first packet, a second packet generation unit configured to generate a second packet by changing the path information according to link setting information based on a result of the determination of the second packet controller, and a second transmission unit configured to transmit the second packet to a destination device.

In accordance with an aspect of the present disclosure, the second packet controller may further determine whether the packet passes through the second device based on whether index information, which indicates the link setting information, is included in the path information.

In accordance with an aspect of the present disclosure, the second packet controller may further generate a rule for generating the second packet based on the link setting information, and the second packet generation unit may further generate the second packet by changing the path information included in the received first packet according to the generated rule.

In accordance with an aspect of the present disclosure, the changing of the path information may include inserting destination address information into a destination port of the received first packet and inserting address information of the second device into a source port of the received first packet.

In accordance with an aspect of the present disclosure, the second reception unit may further receive a response packet in response to the transmitted second packet, the second packet controller may further generate a third packet by changing path information of the response packet based on the link setting information, and the second transmission unit may further transmit the third packet to the first device.

In accordance with an aspect of the present disclosure, the second packet controller may further generate a rule for changing the path information included in the response packet, based on the link setting information, and the second packet generation unit may further generate the third packet by changing the path information included in the response packet based on the generated rule.

In accordance with an aspect of the present disclosure, the generating of the third packet may include inserting address information of the first device into a destination port of the response packet and inserting address information of a destination into a source port of the response packet.

In accordance with an aspect of the present disclosure, a non-transitory computer-readable storage medium is provided. The non-transitory computer-readable storage medium stores instructions that, when executed, cause at least one processor to perform the above methods of communication.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 11 illustrates a structure of a device to explain a method of communication according to an embodiment of the present disclosure.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

FIGS. 1 through 11, discussed below, and the various embodiments used to describe the principles of the present disclosure in this patent document are by way of illustration only and should not be construed in any way that would limit the scope of the disclosure. Those skilled in the art will understand that the principles of the present disclosure may be implemented in any suitably arranged communications system. The terms used to describe various embodiments are exemplary. It should be understood that these are provided to merely aid the understanding of the description, and that their use and definitions in no way limit the scope of the present disclosure. Terms first, second, and the like are used to differentiate between objects having the same terminology and are in no way intended to represent a chronological order, unless where explicitly stated otherwise. A set is defined as a non-empty set including at least one element.

Figure 1:
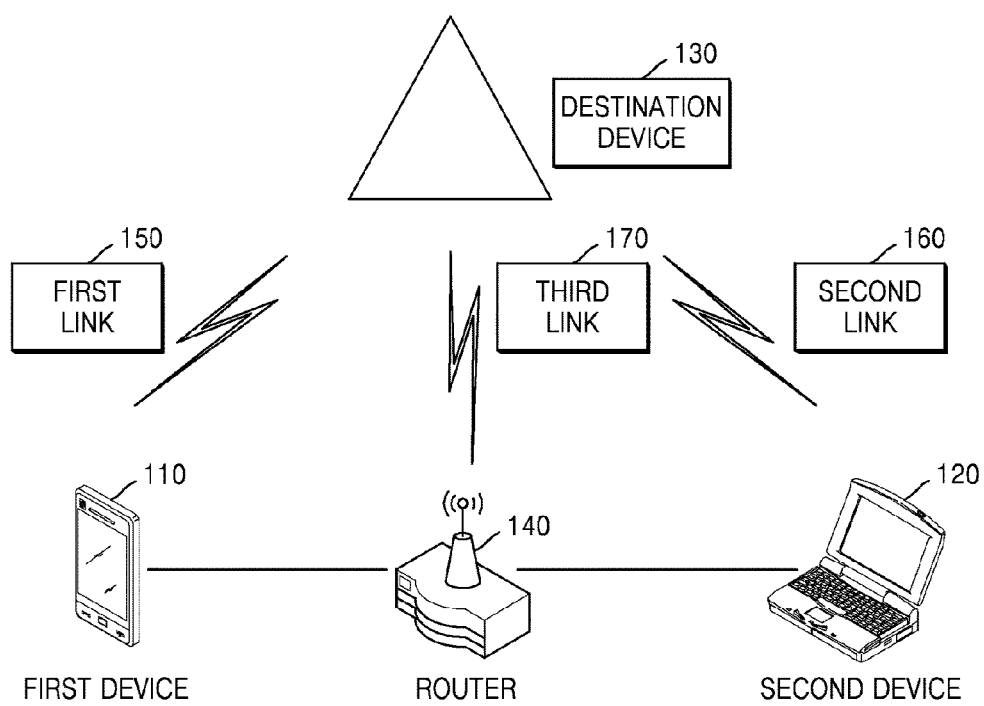
FIG. 1 illustrates various communications according to an embodiment of the present disclosure.

FIG. 1 illustrates various communications according to an embodiment of the present disclosure. According to an embodiment of the present disclosure, devices within a network may use a software defined networking (SDN) technology.

Referring to FIG. 1, a first device 110, a second device 120 and a router 140 are illustrated, where the first device 110 and the second device 120 may be devices which use the SDN technology, where the router 140, for example, cannot use the SDN technology.

The SDN technology is a technology which controls the network by separating hardware from software. The network device is specialized in transmission and thus is optimized in transmission, and the functions related with the other operations or function implementation are separately processed by software, so that all network devices within the network are managed by software. The SDN is easy to one of ordinary skill in the art, and thus detailed explanation of the SDN is omitted here.

As mentioned above, the existing router 140, as illustrated in FIG. 1, generally cannot use the SDN technology. In existing network devices, hardware and software are integrated, and thus the network device can be controlled by only the software corresponding to the hardware.

According to an embodiment of the present disclosure, the first device 110, which uses the SDN technology, may obtain information of links which may be used by each device within the network. Furthermore, the first device 110 may select a path which is the combination of quickest links in order to transmit the packet to a destination device 130 according to the information of links. For example, the first device 110 may obtain information of a first link 150, a second link 160, and a third link 170, and may select the quickest link by using the obtained information.

If the first device 110 and the second link 160 obtain the quickest information, the first device 110 may select the second link 160. However, the first device 110 cannot communicate with the destination device 130 through the second link using a general communication method. In a general network, devices are connected based on the router 140, and the devices connected to the router 140 can communicate with the destination device 130 only through the router 140. For example, when the first device 110 is connected to the router 140, the first device 110 needs to communicate with the destination device 130 using the third link 170 via the router 140. Hence, the first device 110 cannot communicate with the destination device 130 using a path including the quickest link.

According to an embodiment of the present disclosure, a method and apparatus for communicating with the destination device 130 by the first device 110 which uses the SDN technology, by using a path including the quickest link within a network including a router 140 which is the existing network device.

Figure 2:
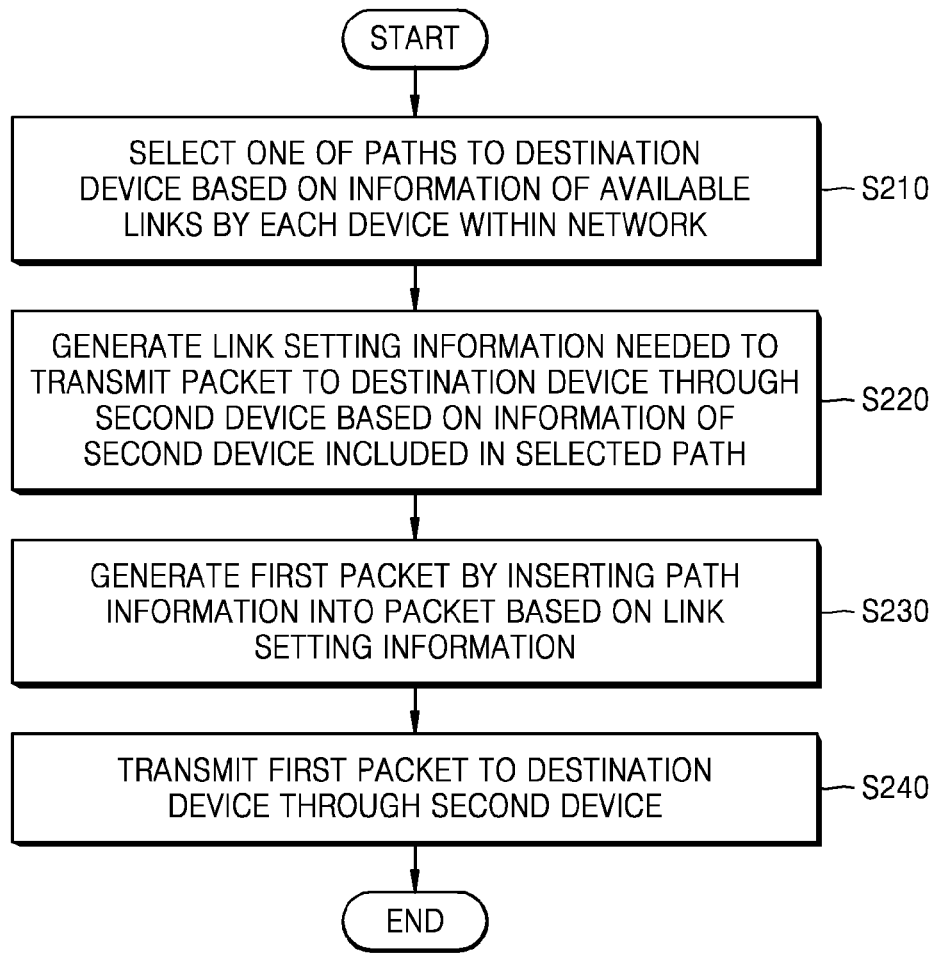
FIG. 2 is a flowchart illustrating a method of generating and transmitting a first packet by a first device according to an embodiment of the present disclosure.

FIG. 2 is a flowchart illustrating a method of generating and transmitting a first packet by a first device according to an embodiment of the present disclosure.

According to an embodiment of the present disclosure, the first device may vary. For example, the first device may be a computer, a notebook computer, a mobile device, a mobile phone, a tablet computer, etc. Furthermore, the first device may use the SDN technology. For example, the first device 110, as illustrated in FIG. 1, may control network devices within the network using software. The first device 110 may be prepared to use the SDN technology or use the SDN technology through software installation.

Referring to FIG. 2, a flowchart illustrating a method is illustrated, such that in operation S210, a first device 110, as illustrated, in FIG. 1, selects one of paths to the destination device based on information of available links which may be used by each device within the network.

According to an embodiment of the present disclosure, the first device 110 may obtain information of links which may be used by each device within the network. For example, the first device 110 may obtain such information as the first link 150, the second link 160, and the third link 170, as illustrated in FIG. 1. The link may be defined as a path which is used or usable when each device communicates with the destination device 130, as illustrated in FIG. 1. For example, the link may include Wi-Fi, worldwide interoperability for microwave access (WiMAX), third generation (3G), and fourth generation (4G) connections, and is not limited thereto.

According to an embodiment of the present disclosure, information of links may include state information on links. For example, information of links may include traffic information, error information, link speed, and link usage, etc.

According to an embodiment of the present disclosure, the first device 110 may select one of paths to the destination device based on the information of links. For example, the first device 110 may determine the quickest link from among the first link 150, the second link 160, and the third link 170 so as to select the path to the destination device 130. If the first device 110 determines that the second link 160 is quickest, the first device 110 may select the path which transmits the packet to the destination device 130 via the second device 120, as illustrated in FIG. 1, including the second link 160. When a plurality of links are included in the path to the destination device 130, the path to the destination device 130 may be selected by determining combination of the quickest links.

In operation S220, the first device 110 generates link setting information which is needed to transmit the packet to the destination device through the second device 120 based on the information of the second device included in the selected path.

According to an embodiment of the present disclosure, the second device 120 may vary. The second device 120 may be a computer, a mobile device, a mobile phone, a tablet computer, etc. Furthermore, the second device 120 may use the SDN technology. For example, the second device 120 may control network devices within the network using software. The second device 120 may be prepared to use the SDN technology or may use the SDN technology through software installation. Here, it is assumed that the second device 120 is singular for the convenience of description. If a plurality of devices, which may use the SDN technology, are included in the path selected by the first device 110, there may be a plurality of second devices 120.

According to an embodiment of the present disclosure, the first device 110 may generate link setting information based on information of the second device 120 included in the selected path.

According to an embodiment of the present disclosure, the link setting information is defined as information which is needed for the first device 110 to communicate with the destination device 130 using the path selected by the first device 110. For example, the link setting information may include address information of the second device 120, port information of the second device 120, address information of the first device, 110, port information of the first device 110, address information of the destination device 130, port information of the destination device 130, setting information on transmission control protocol/internet protocol (TCP/IP) 4 layers of the first device 110 and the second device 120.

According to an embodiment of the present disclosure, link setting information generated by the first device 110 may be shared by devices which may use the SDN technology within the network. For example, the link setting information generated by the first device 110 may be used by the second device 120.

According to an embodiment of the present disclosure, the first device 110 may generate index information along with link setting information. The index information is defined as information which indicates whether the packet is a packet which passes the device which receives the packet, and allows the device which receives the packet to obtain predetermined information included in the link setting information. For example, when index information is included in the received packet, the second device 120 may determine that the packet passes the second device 120, and may obtain the address information of the destination device of the packet received in the link setting information which is indicated by the index information.

According to an embodiment of the present disclosure, the first device 110 may generate the index information in various methods. For example, the first device 110 may use a hash code, which is generated using the hash function, as index information.

Figure 8:
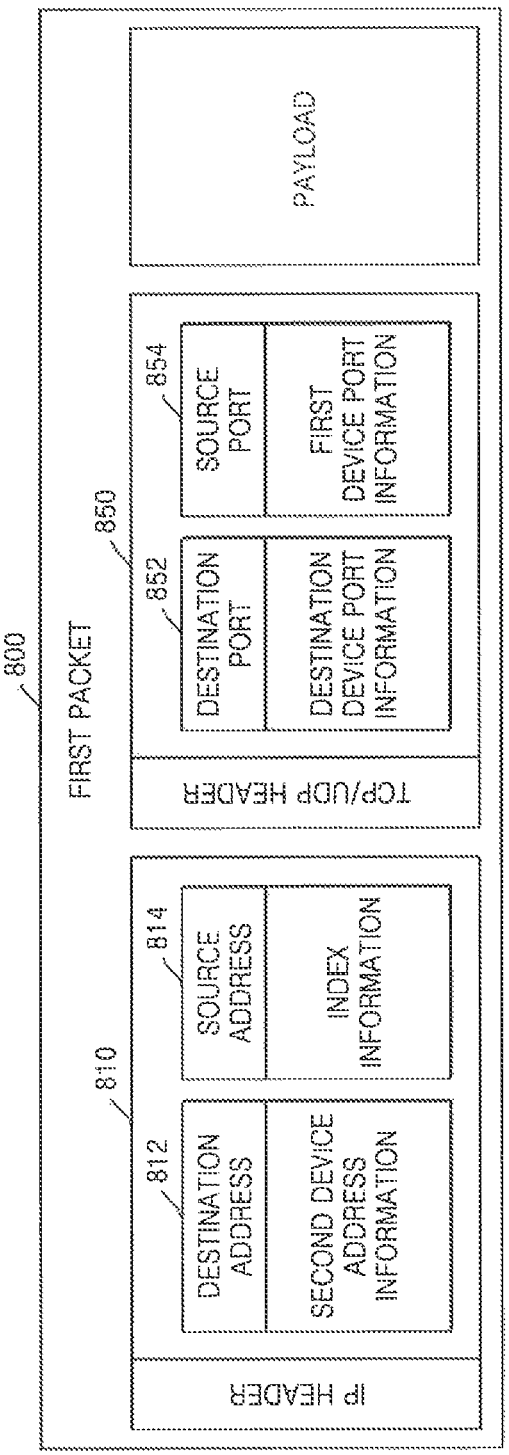
FIG. 8 is a block diagram of a first packet according to an embodiment of the present disclosure.

According to operation S230, the first device 110 generates a first packet 800, as illustrated in FIG. 8, by inserting path information to the packet based on the generated link setting information.

According to an embodiment of the present disclosure, the first device 110 may generate a packet to be transmitted to the destination device.

According to an embodiment of the present disclosure, when the path selected by the first device 110 is a path which passes through the second device 120, the first device 110 may generate the first packet 800 by inserting path information to the packet based on the link setting information so that the transmitted packet may pass through the second device 120. Furthermore, the first device 110 may generate a rule which inserts the path information to the packet using generated link setting information. The rule which inserts path information is defined as a method which inserts path information to the packet so that the first device 110 may communicate with the destination device 130 through the selected path. For example, the first device 110 may generate a rule of inserting generated index information on the source port of the packet header and inserting the address information of the second device on a destination port of the packet header. The first device 110 may generate the first packet 800 depending on the rule.

In operation S240, the first device transmits the generated first packet 800.

According to an embodiment of the present disclosure, the first device 110 may transmit the first packet 800 using a wired, wireless, and home network. For example, the first device 110 may transmit the first packet 800 using the connected router 140, as illustrated in FIG. 1. The address information of the second device is inserted in a destination port of the first packet, and thus the router 140, which receives the first packet 800, may transmit the first packet 800 to the second device 120. The second device 120 receives the first packet 800 and transmits the received first packet 800 to the destination device, and the operation performed by the second device 120 is described below with reference to FIG. 3.

Figure 3:
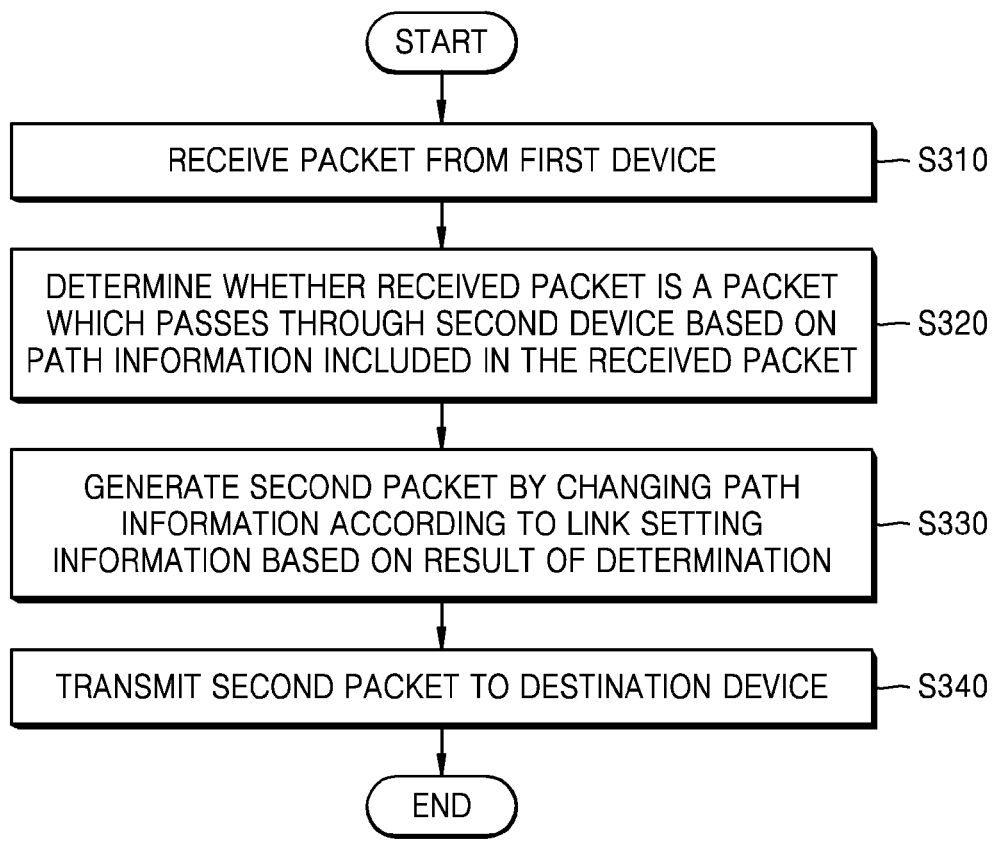
FIG. 3 is a flowchart illustrating a method of generating and transmitting a second packet by a second device according to an embodiment of the present disclosure.

FIG. 3 is a flowchart illustrating a method of generating and transmitting a second packet by a second device, according to an embodiment of the present disclosure.

Referring to FIG. 3, a flowchart is illustrated, such that in operation S310, a second device 120, as illustrated in FIG. 1, receives a packet from the first device 110, as illustrated in FIG. 1.

According to an embodiment of the present disclosure, the second device 120 may receive the first packet 800, as illustrated in FIG. 8, using a wired, wireless, and home network from the first device 110. For example, the second device 120 may receive the first packet 800 using the router 140, as illustrated in FIG. 1.

In operation S320, the second device 120 determines whether the received packet is a packet which passes through the second device 120 based on the path information included in the received packet.

According to an embodiment of the present disclosure, the second device 120 may determine whether the received packet is a packet which passes through the second device 120 by the information on whether index information indicating the link setting information is included. For example, if the index information is included in the packet received by the second device 120, the second device 120 may determine the received packet as the first packet 800, which is transmitted to the destination device 130, as illustrated in FIG. 1, via the second device 120 according the path selected by the first device 110.

Figure 9:
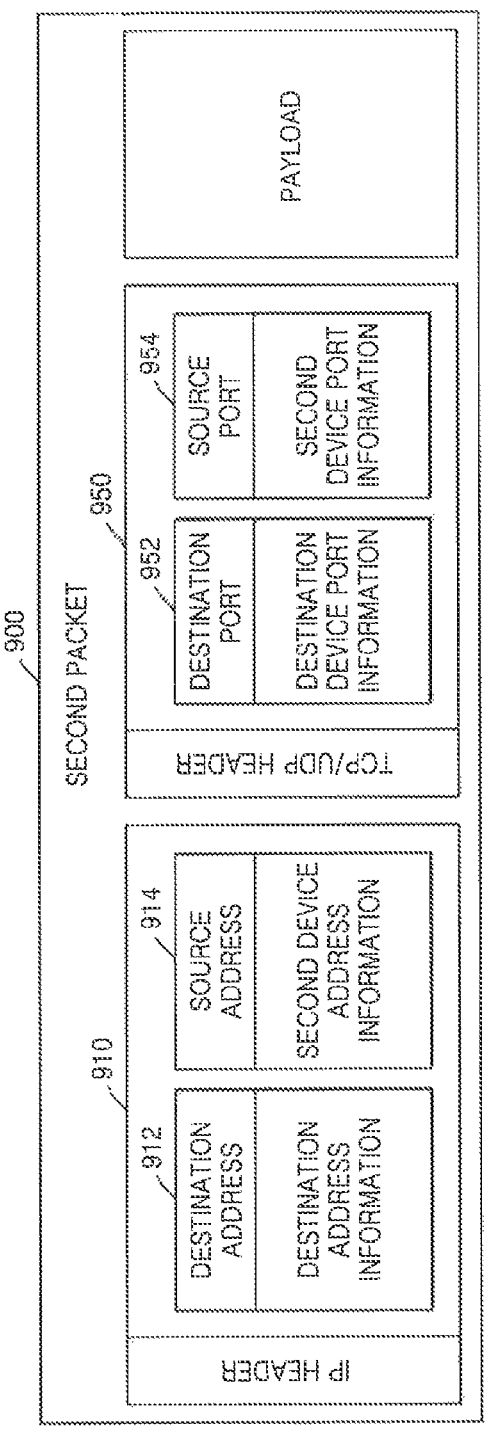
FIG. 9 is a block diagram of a second packet according to an embodiment of the present disclosure.

In operation S330, the second packet 900, as illustrated in FIG. 9, is generated by changing the path information according to the link setting information based on the result of the determination performed in operation S320.

According to an embodiment of the present disclosure, the second device 120 may generate the second packet 900 by changing the path information included in the packet according to the link setting information which is indicated by the index information of the received packet. Furthermore, the second device 120 may generate a rule which changes the path information included in the packet using link setting information. The rule which changes the path information is defined as a method which changes path information of the packet so that the first device 110 may communicate with the destination device 130 through the selected path.

For example, the second device 120 may generate a rule of inserting address information of the second device 120 into a source port of a packet header, and inserting the address information of the destination device 130 into a destination port of the packet header. The second device 120 may generate the second packet 900 by changing the path information included in the packet according to the generated rule.

In operation S340, the second device 120 transmits the generated second packet 900 to the destination device 130.

According to an embodiment of the present disclosure, the second device 120 may transmit the second packet 900 to the destination device 130 through the link selected by the first device 110. For example, the second device 120 may transmit the generated second packet 900 to the destination device 130 through the second link 160 which has determined that the first device 110 is the quickest.

Figure 4:
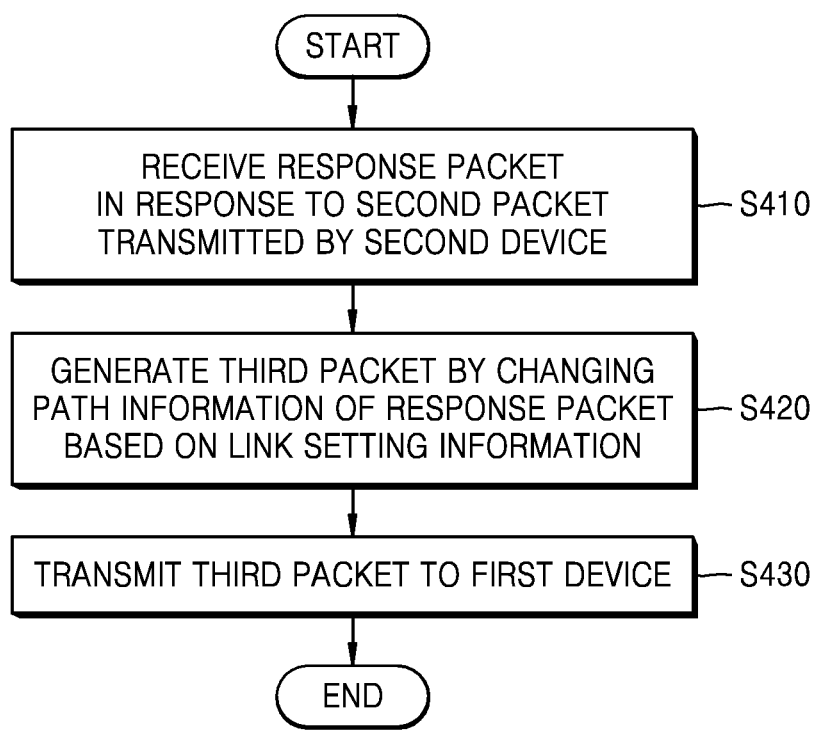
FIG. 4 is a flowchart illustrating a method of receiving a response packet and generating and transmitting a third packet by a second device according to an embodiment of the present disclosure.

FIG. 4 is a flowchart illustrating a method of receiving a response packet and generating and transmitting a third packet by a second device, according to an embodiment of the present disclosure.

Referring to FIG. 4, a flowchart is illustrated, such that in operation S410, the second device 120, as illustrated in FIG. 1, receives a response packet in response to the transmitted second packet 900, as illustrated in FIG. 9.

According to an embodiment of the present disclosure, the second device 120 may receive a response packet in response to the second packet 900 transmitted from the destination device 130, as illustrated in FIG. 1.

According to an embodiment of the present disclosure, the second device 120 may determine whether the received packet is a response packet by various information sets included in a header. For example, the second device 120 may determine whether the received packet is a response packet based on a TCP/user datagram protocol (UDP) header of the received packet. In detail, if the address information included in a source port of the TCP/UDP header of the second packet 900 transmitted by the second device 120 is included in a destination port of the TCP/UDP header included in the packet received from the destination device 130, the second device 120 may determine that the received packet is a response packet to the second packet 900.

In operation S420, the second device 120 may generate a third packet by changing the path information of the response packet based on the link setting information.

According to an embodiment of the present disclosure, if the second device 120 receives a response packet to the second packet, the second device 120 may determine that the actual destination of the response packet is not the second device 120, but the first device 110. Hence, a third packet including the address information of the first device 110 may be generated to be transmitted the third packet to the first device 110.

Figure 10:
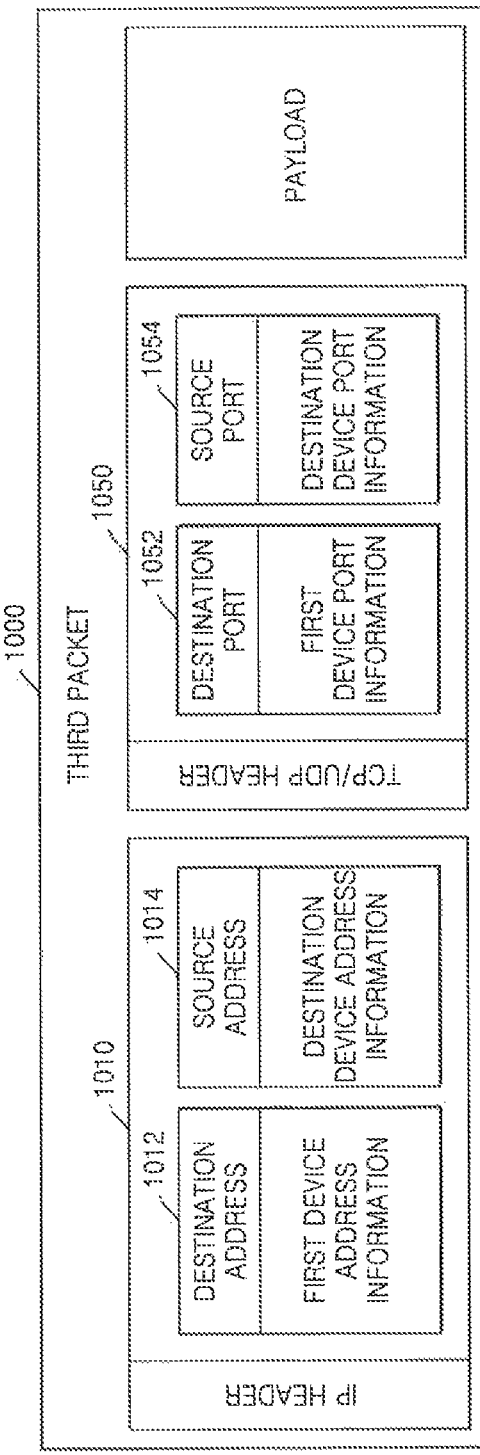
FIG. 10 is a block diagram of a third packet according to an embodiment of the present disclosure.

According to an embodiment of the present disclosure, when the second device determines that the received packet is a response packet to the transmitted second packet 900, the second device 120 may generate the third packet by changing path information included in the response packet. Furthermore, the second device 120 may generate a rule which changes path information included in the response packet using link setting information. For example, the second device 120 may generate a rule of inserting address information of the destination device 130 into the source port of the response packet header, and inserting the address information of the first device 110 into a destination port of the packet header. The second device 120 may generate the third packet 1000, as illustrated in FIG. 10, by changing the path information included in the response packet according to the generated rule.

In operation S430, the second device 120 transmits the generated third packet to the first device 110.

According to an embodiment of the present disclosure, the second device 120 may transmit the third packet 1000 using a wired, wireless, and home network. For example, the second device 120 may transmit the third packet 1000 through the connected router 140, as illustrated in FIG. 1. The address information of the first device 110 has been inserted into a destination port of the third packet 1000 which is transmitted by the second device 120, and thus the router 140, which has received the third packet 1000, may transmit the third packet 1000 to the first device 110.

Figure 5:
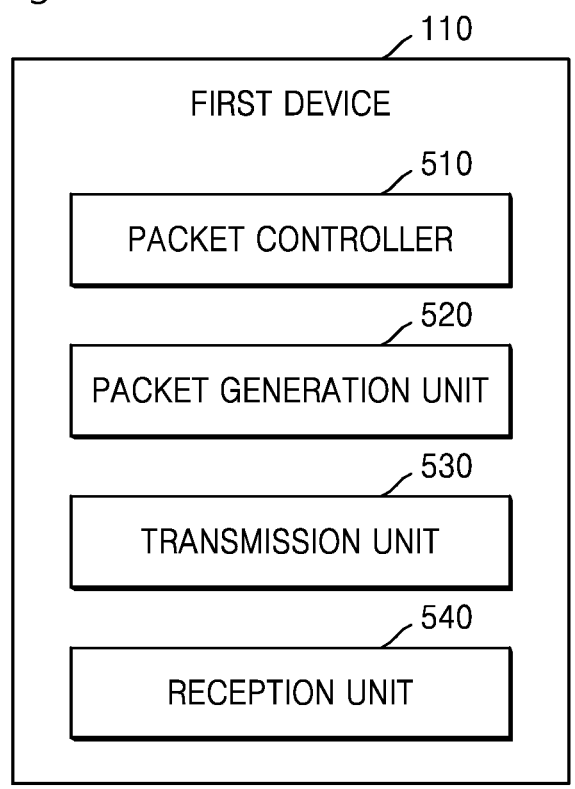
FIG. 5 is a block diagram of a first device according to an embodiment of the present disclosure.

FIG. 5 is a block diagram of a first device, according to an embodiment of the present disclosure.

Referring to FIG. 5, a first device 110 is illustrated, where the first device 110 of the present disclosure may include a packet controller 510, a packet generation unit 520, a transmission unit 530, and a reception unit 540.

According to an embodiment of the present disclosure, the packet controller 510 of the first device 110 may obtain information of links, which may be used by each device within the network. For example, the packet controller 510 of the first device 110 may obtain information such as the first link 150, as illustrated in FIG. 1, the second link 160, as illustrated in FIG. 1, and the third link 170, as illustrated in FIG. 1. That is, information on each path within the network may be obtained.

According to an embodiment of the present disclosure, the packet controller 510 of the first device 110 may select one of paths to the destination device 130, as illustrated in FIG. 1, based on information of links. For example, the packet controller 510 of the first device 110 may select the path to the destination device 130 by determining the quickest link from among the first link 150, the second link 160, and the third link 170, based on link information. If the first device 110 determines that the second link 160 is the quickest, the first device 110 may select the path to transmit the packet to the destination device 130 via the second device 120 including the second link 160. When a plurality of links are included in the path to the destination device 130, the path to the destination device 130 may be selected by determining a combination of the quickest links.

According to an embodiment of the present disclosure, the packet controller 510 of the first device 110 may generate link setting information based on information of the second device 120 included in the selected path. The link setting information is defined as information which is needed for the first device 110 to communicate with the destination device 130 using the selected path. For example, link setting information generated by the first device 110 may include address information of the second device 120, port information of the second device 120, address information of the first device 110, port information of the first device 110, address information of the destination device 130, port information of the destination device 130, and setting information for TCP/IP 4 layers of the first device 110 and the second device 120.

According to an embodiment of the present disclosure, the packet controller 510 of the first device 110 may generate index information along with the link setting information. The index information is defined as information which indicates whether the packet is a packet which passes the device which receives the packet, and allows the device which receives the packet to obtain predetermined information included in the link setting information. For example, when index information is included in the received packet, the second device 120 may determine that the packet passes through the second device 120, and may obtain the address information of the destination device of the packet received in the link setting information which is indicated by the index information.

According to an embodiment of the present disclosure, the packet controller 510 of the first device 110 may generate index information in various methods. For example, the first device 110 may use a hash code, which is generated using a hash function, as index information.

According to an embodiment of the present disclosure, when a second device 120 is included in the path selected by the packet controller 510, the packet generation unit 520 of the first device 110 may generate the first packet 800, as illustrated in FIG. 8, by inserting the path information into the packet based on the link setting information so that the packet transmitted by the first device 110 may pass through the second device 120.

According to an embodiment of the present disclosure, the packet controller 510 of the first device 110 may generate a rule which inserts the path information into the packet using generated link setting information. The rule, which inserts path information, is defined as a method of inserting path information into the packet so that the first device 110 may communicate with the destination device 130 through the selected path. For example, the packet controller 510 of the first device 110 may generate a rule of inserting index information into a source port of a packet header and inserting address information of the second device 120 into a destination port of the packet header so that the generated packet may use the second link 160.

According to an embodiment of the present disclosure, the packet generation unit 520 of the first device 110 may generate the first packet 800 by inserting path information of the packet according to the rule.

According to an embodiment of the present disclosure, the transmission unit 530 of the first device 110 may transmit the first packet 800 through a wired, wireless, and home network. For example, the transmission unit 530 of the first device 110 may transmit the first packet 800 through the connected router 140, as illustrated in FIG. 1. The address information of the second device has been inserted into a destination port of the first packet 800 which is transmitted by the transmission unit 530, and thus the router 140, which receives the first packet 800, may transmit the first packet 800 to the second device 120.

Figure 6:
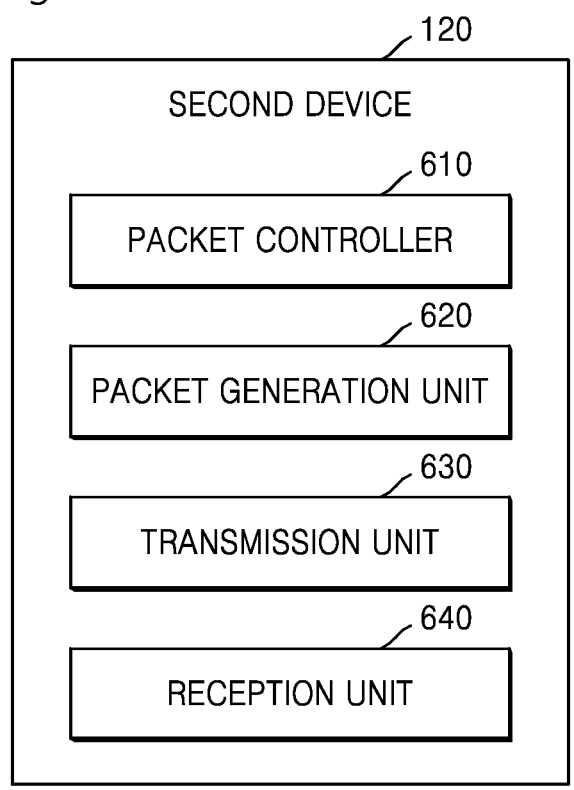
FIG. 6 is a block diagram of a second device according to an embodiment of the present disclosure.

FIG. 6 is a block diagram of a second device, according to an embodiment of the present disclosure.

Referring to FIG. 6, a second device 120 is illustrated, where the second device 120 of the present disclosure may include a packet controller 610, a packet generation unit 620, a transmission unit 630, and a reception unit 640.

The reception unit 640 of the second device 120 may receive a packet from the first device 110, as illustrated in FIG. 1, through a wired, wireless, and home network. For example, the reception unit 640 of the second device 120 may receive a packet using the router 140, as illustrated in FIG. 1.

According to an embodiment of the present disclosure, the packet controller 610 of the second device 120 may determine whether the received packet is a packet which passes through the second device 120 based on information included in the received packet. For example, if index information is included in the packet received by the reception unit 640 of the second device 120, the packet controller 610 of the second device 120 may determine the received packet as the first packet 800, as illustrated in FIG. 8, which is transmitted to the destination device 130, as illustrated in FIG. 1, via the second device 120 according to the path selected by the first device 110. The second device 120 may determine that the packet received based on another piece of information set included in the received packet, not index information, is the first packet 800 which is transmitted via the second device 120.

According to an embodiment of the present disclosure, the packet generation unit 620 of the second device 120 may generate the second packet 900, as illustrated in FIG. 9, by changing path information included in the packet according to the link setting information indicated by the index information of the received packet.

According to an embodiment of the present disclosure, the packet controller 610 of the second device may generate a rule which changes path information included in the packet using the link setting information. The rule, which changes the path information, is defined as a method in which the first device 110 changes information included in the packet for communication with the destination device 130. For example, the packet controller 610 of the second device 120 may generate a rule of inserting the address information of the second device 120 into a source port of a packet header and inserting address information of the destination device 130 into a destination port of the packet header so that the generated packet may use the second link 160, as illustrated in FIG. 1.

According to an embodiment of the present disclosure, the packet generation unit 620 of the second device 120 may generate the second packet 900 by changing the path information of the packet according to the rule.

According to an embodiment of the present disclosure, the transmission unit 630 of the second device 120 may transmit the generated second packet to the destination device 130 through the link selected by the first device. For example, the second device 120 may transmit the generated second packet to the destination device 130 through the second link 160 which has determined that the first device 110 is the quickest.

According to an embodiment of the present disclosure, the reception unit 640 of the second device 120 may receive a response packet to the second packet which is transmitted from the destination device 130.

According to an embodiment of the present disclosure, the packet controller 610 of the second device 120 may determine whether the received packet is a response packet based on the header of the received packet. For example, if address information included in a source port of a TCP/UDP header of the second packet transmitted by the second device 120 is included in a destination port of the TCP/UDP header included in the packet received from the destination device 130, the packet controller 610 may determine that the received packet is a response packet to the second packet.

According to an embodiment of the present disclosure, when the packet controller 610 of the second device determines that the received packet is a response packet to the transmitted second packet, the packet controller 610 may generate a third packet 1000, as illustrated in FIG. 10, by changing path information included in the response packet using the packet generation unit 620. The packet controller 610 of the second device 120 may generate a rule which changes path information included in the response packet using the link setting information. The rule, which changes the path information, is defined as a method of changing the information included in the packet so that the first device 110 may communicate with the destination device 130 through the selected path.

For example, the packet controller 610 of the second device 120 may generate a rule of inserting address information of the destination device 130 into the source port of the packet header and inserting address information of the first device 110 into a destination port of the packet header so that the response packet may be transmitted to the first device 110.

According to an embodiment of the present disclosure, the packet generation unit 620 of the second device 120 may generate the third packet 1000 by changing the path information of the packet according to the rule.

According to an embodiment of the present disclosure, the transmission unit 630 of the second device 120 may transmit the third packet 1000 to the first device 110 through the existing network. For example, the address information of the first device 110 is included in the destination information of the third packet 1000 which is transmitted by the transmission unit 630 of the second device 120, and thus the second device 120 may transmit the third packet to the first device through the router 140.

Figure 7:
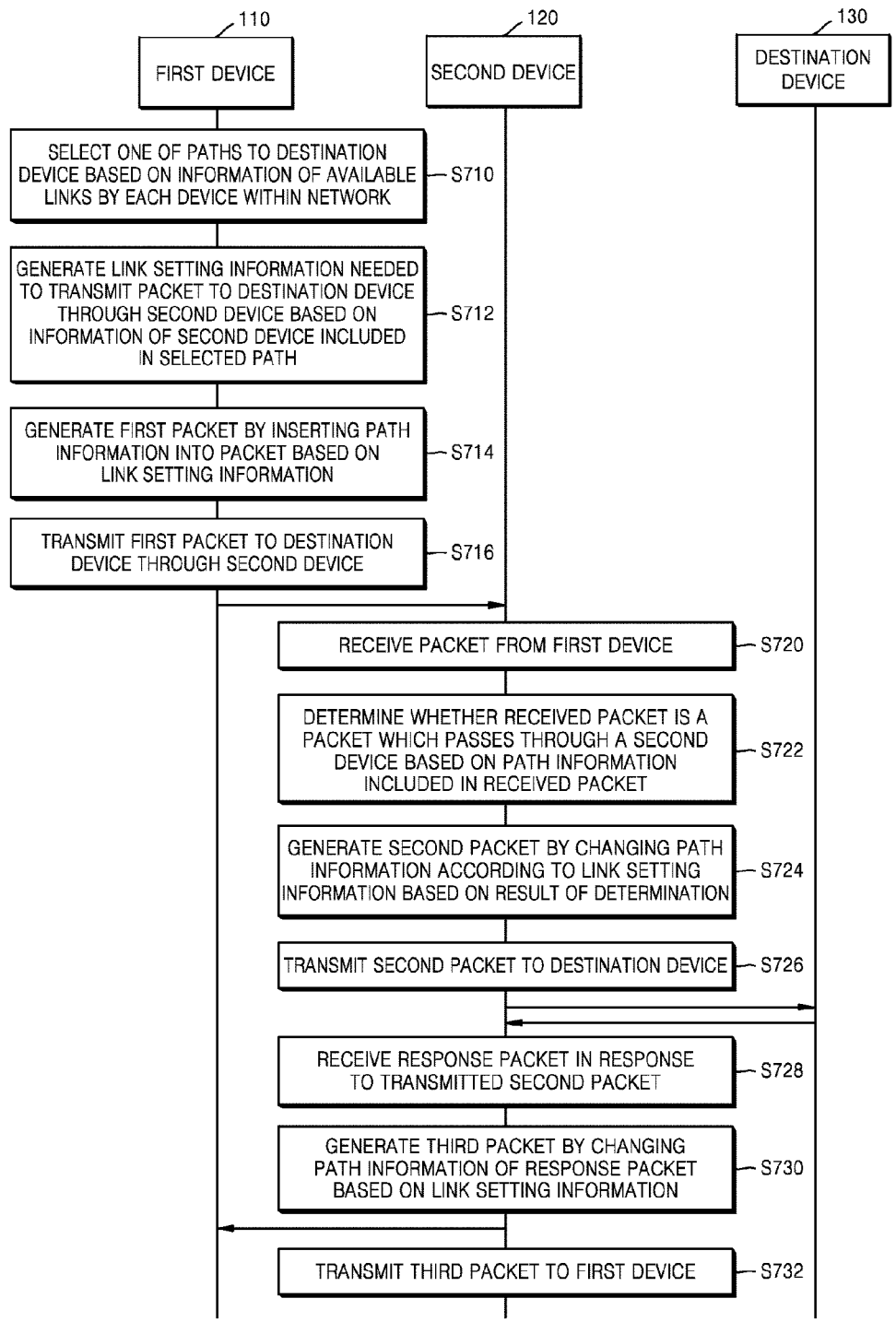
FIG. 7 is a detailed flowchart illustrating a method of performing communication using a packet generated by a first device according to an embodiment of the present disclosure.

FIG. 7 is a detailed flowchart illustrating a method of performing communication using a packet generated by a first device, according to an embodiment of the present disclosure.

Referring to FIG. 7, a flowchart is illustrated, such that in operation S710, a first device 110 may obtain information of available links which may be used by each device within a network.

According to an embodiment of the present disclosure, the first device 110 may obtain information such as the first link 150, as illustrated in FIG. 1, the second link 160, as illustrated in FIG. 1, and the third link 170, as illustrated in FIG. 1. Furthermore, the first device 110 may select one of paths to a destination device 130 based on information of available links by each device within the network. For example, the first device 110 may select the path to the destination device 130 by determining the quickest link from among the first link 150, the second link 160, and the third link 170 based on link information.

If the first device determines that the second link 160 is the quickest, the first device 110 may select the path which transmits the packet to the destination device 130 via a second device 120 including the second link 160. When a plurality of links are included in the path to the destination device 130, the path to the destination device 130 may be selected by determining the combination of the quickest links.

In operation S712, the first device 110 may generate link setting information needed to transmit a packet to the destination device 130 through the second device 120 based on information of the second device 120 that is included in the selected path.

According to an embodiment of the present disclosure, the link setting information is defined as information which is needed to communicate with the destination device 130 using the path selected by the first device 110. For example, the link setting information may include address information of the second device 120, port information of the second device 120, address information of the first device 110, port information of the first device 110, address information of the destination device 130, port information of the destination device 130, and setting information on TCP/IP 4 layers of the first device 110 and the second device 120.

According to an embodiment of the present disclosure, the first device 110 may generate index information along with link setting information. The index information is defined as information which indicates whether the packet is a packet which passes through the device which receives the packet, and allows the device which receives the packet to obtain predetermined information included in the link setting information. For example, when index information is included in the received packet, the second device 120 may determine that the packet passes the second device 120, and may obtain the address information of the destination device 130 of the packet received in the link setting information which is indicated by the index information.

According to an embodiment of the present disclosure, the first device 110 may generate index information in various methods. For example, the first device 110 may use a hash code, which is generated using the hash function, as index information.

In operation S714, when the second device 120 is included in the path selected by the first device 110, the first device 110 may generate the first packet 800, as illustrated in FIG. 8, by inserting path information into the packet based on the link setting information so that the transmitted packet may pass through the second device 120.

According to an embodiment of the present disclosure, the first device 110 may generate a rule which inserts the path information into the packet using the generated link setting information. The rule, which inserts path information, is defined as a method of inserting path information into the packet so that the first device 110 may communicate with the destination device 130 through the selected path. For example, the first device 110 may generate a rule of inserting index information generated in a source port of a packet header and inserting address information of the second device into a destination port of the packet header so that the generated packet may use the second link 160. The first device 110 may generate the first packet 800 according to the rule.

In operation S716, the first device 110 may transmit the first packet 800 to the destination device 130 via the second device 120 included in the selected path.

According to an embodiment of the present disclosure, the address information of the second device 120 has been inserted into a destination port of the first packet 800 transmitted by the first device 110, and thus the router 140, as illustrated in FIG. 1, which has received the first packet 800, may transmit the first packet 800 to the second device 120.

In operation S720, the second device 120 may receive a packet using a wired, wireless, and home network from the first device 110. For example, the second device 120 may receive a packet using the router 140.

In operation S722, the second device 120 may determine whether the received packet is a packet which passes through the second device 120 based on the path information included in the received packet.

According to an embodiment of the present disclosure, if index information is included in the packet received by the reception unit 640, as illustrated in FIG. 6, the second device 120 may determine that the receive packet is the first packet 800 which is transmitted to the destination device 130 via the second device 120 according to the path selected by the first device 110.

In operation S724, the second device 120 may generate the second packet 900, as illustrated in FIG. 9, by changing the path information included in the packet according to the link setting information indicated by the index information of the received packet.

According to an embodiment of the present disclosure, the second device 120 may generate a rule which changes the path information included in the packet using link setting information. The rule, which changes the path information, is defined as a method in which the first device 110 changes the path information of the packet for communication with the destination device 130. For example, the second device 120 may generate a rule of inserting address information of the second device 120 into a source port of a packet header and inserting the address information of the destination device 130 into a destination port of the packet header. The second device 120 may generate the second packet 900 by changing the path information included in the packet according to the generated rule.

In operation S726, the second device 120 may transmit the generated second packet 900 to the destination device 130 through the link selected by the first device 110.

According to an embodiment of the present disclosure, the second device 120 may transmit the generated second packet 900 to the destination device 130 through the second link 160 about which the first device 110 has determined as the quickest.

In operation S728, the second device 120 may receive a response packet in response to the second packet 900 transmitted from the destination device 130.

According to an embodiment of the present disclosure, the second device 120 may determine whether the received packet is a response packet by various information sets included in the header. For example, the second device 120 may determine whether the received packet is a response packet based on the TCP/UDP header of the received packet. In detail, if the address information included in a source port of the TCP/UDP header of the second packet 900 transmitted by the second device 120 is included in a destination port of the TCP/UDP header included in the packet received from the destination device 130, the second device 120 may determine that the received packet is a response packet to the second packet 900.

In operation S730, when the second device 120 determines that the received packet is a response packet to the second packet 900, the second device 120 may generate the third packet 1000, as illustrated in FIG. 1, by changing the path information included in the response packet using the packet generation unit 620, as illustrated in FIG. 6.

According to an embodiment of the present disclosure, if the second device 120 receives a response packet to the second packet, the second device 120 may determine that the actual destination of the response packet is not the second device 120, but the first device 110. Hence, a third packet 1000 including the address information of the first device 110 may be generated to be transmitted to the first device 110.

According to an embodiment of the present disclosure, the second device 120 may generate a rule which changes path information included in a response packet using link setting information. For example, the second device 120 may generate a rule of inserting address information of the destination device 130 into a source port of a response packet header and inserting the address information of the first device 110 into a destination port of the packet header. The second device 120 may generate the third packet 1000 by changing the path information included in the response packet according to the generated rule.

In operation S732, the transmission unit 630 may transmit the generated third packet 1000 to the first device.

According to an embodiment of the present disclosure, the second device 120 may transmit the third packet 1000 using a wired, wireless, and home network. For example, the second device 120 may transmit the third packet 1000 through the connected router 140. The address information of the first device 110 has been inserted into a destination port of the third packet 1000 transmitted by the second device 120, and thus the router 140, which has received the third packet 1000, may transmit the third packet 1000 to the first device 110

FIG. 8 is a block diagram of a first packet, according to an embodiment of the present disclosure.

Referring to FIG. 8, a first packet 800 is illustrated, such that according to an embodiment of the present disclosure, the first device 110, as illustrated in FIG. 1, may generate the first packet 800, which has already been explained with reference to FIGS. 2 to 8. The first packet 800 includes a payload, an IP header 810 and a TCP/UDP header 850.

For example, the first device 110 may generate the first packet 800 by inserting index information into a source address 814 of the IP header 810 of the first packet 800, inserting address information of the second device into a destination address 812 of the IP header 810, inserting port information of the destination device 130, as illustrated in FIG. 1, into a destination port 852 of the TCP/UDP header 850 of the first packet 800, and inserting port information of the first device 110 into to source port 854 of the TCP/UDP header 850 in order to communicate with the destination device 130, as illustrated in FIG. 1, using the selected second link 160, as illustrated in FIG. 1.

FIG. 9 is a block diagram of a second packet, according to an embodiment of the present disclosure.

Referring to FIG. 9, a second packet 900 is illustrated, such that according to an embodiment of the present disclosure, the second device 120, as illustrated in FIG. 1, may generate the second packet 900, which has already been explained with reference to FIGS. 2 to 8. The second packet 900 includes a payload, an IP header 910 and a TCP/UDP header 950.

For example, the second device 120 may generate the second packet 900 by inserting address information of the second device 120 into a source address 914 of the IP header 910 of the second packet 900, inserting address information of the destination device 130, as illustrated in FIG. 1, into a destination address 912 of the IP header 910, inserting port information of the destination device 130 into a destination port 952 of the TCP/UDP header 950 of the second packet 900, and inserting port information of the second device 120 into a source port 954 of the TCP/UDP header 950 in order to transmit the received second packet 900 to the destination device 130.

FIG. 10 is a block diagram of a third packet, according to an embodiment of the present embodiment.

Referring to FIG. 10, a third packet 1000 is illustrated, such that according to an embodiment of the present disclosure, the second device 120, as illustrated in FIG. 1, may receive a response packet to generate the third packet 1000, which has already been explained with reference to FIGS. 2 to 8. The third packet 1000 includes a payload, an IP header 1010 and a TCP/UDP header 1050.

For example, the second device 120 may generate the third packet 1000 by inserting address information of the destination device 130, as illustrated in FIG. 1, of the second device 120 into a source address 1014 of the IP header 1010 of the response packet, inserting address information of the first device 110, as illustrated in FIG. 1, into a destination address 1012 of the IP header 1010, inserting port information of the destination device 130 into a destination port 1052 of the TCP/UDP header 1050 of the packet, and inserting port information of the destination device 130 into a source port 1054 of the TCP/UDP header 1050, in order to transmit the response packet to the first device 110.

FIG. 11 illustrates a structure of a device to explain a method of communication, according to an embodiment of the present disclosure.

Referring to FIG. 11, a first device 110 including a packet controller 510, a packet generation unit 520, a transmission unit 530 and a reception unit 540, a second device 120 including a packet controller 610, a packet generation unit 620, a transmission unit 630 and a reception unit 640, a first link 150, a second link 160, a third link 170, a router 140 and a destination device 130 are illustrated, such that according to an embodiment of the present disclosure, the devices within a network may use SDN technology.

For example, the first device 110 and the second device 120 may use the SDN technology. The SDN technology is a technology of controlling the network by separating hardware from software. In detail, the network device is hardware specialized in transmission and thus is optimized for transmission, and the functions related with other operation or function implementation are separately processed, and thus all network devices within the network are managed by software. The conventional router 140 does not generally use the SDN technology. It is because, in the conventional network devices, hardware and software are integrated, and thus network devices may be controlled by only software corresponding to hardware.

According to an embodiment of the present disclosure, a packet controller 510 of the first device 110, which uses the SDN technology, may obtain information of links which may be used by each device within the network. Furthermore, the packet controller 510 of the first device 110 may select the path which is the combination of the quickest links in order to transmit the packet to the destination device 130. For example, the first device 110 may obtain information such as the first link 150, the second link 160, and the third link 170, and may select the quickest link using the obtained information.

If the packet controller 510 of the first device 110 has obtained information that the second link 160 is the quickest, the packet controller 510 of the first device 110 may select the second link 160. However, according to the convention communication method, the first device 110 cannot communicate with the destination device 130 through the second link 160. Generally, in a network, devices are connected based on the router 140, and the devices connected to the router 140 may communicate with the destination device 130 through only the router 140. For example, when the first device is connected to the router 140, the first device 110 may need to communicate with the destination device 130 using the third link 170 via the router 140. Hence, the first device 110 cannot communicate with the destination device 130 using the path including the quickest link.

According to an embodiment of the present disclosure, the first device 110 may generate the first packet 800, as illustrated in FIG. 8, so that the first device 110, which uses the SDN technology, may communicate with the destination device 130 using the path including the quickest link, within the network including the conventional network device. For example, if the first device 110 determines that the second link 160 is the quickest, the first device 110 may select a path which transmits the packet to the destination device via the second device 120 including the second link 160, and the first device 110 may generate link setting information based on information of the second device 120 included in the selected path.

The link setting information is defined as information which is needed for the first device 110 to communicate with the destination device 130 using the selected path. For example, the link setting information may include address information of the second device 120, port information of the second device 120, address information of the first device 110, port information of the first device 110, address information of the destination device 130, port information of the destination device 130, and setting information on TCP/IP 4 layers of the first device 110 and the second device 120. Furthermore, the first device 110 may generate index information along with link setting information.

The index information is defined as information which indicates whether the packet is a packet which passes the device which receives the packet, and allows the device which receives the packet to obtain predetermined information included in the link setting information. For example, when index information is included in the received packet, the second device 120 may determine that the packet passes the second device 120, and may obtain the address information of the destination device of the packet received in the link setting information which is indicated by the index information. The first device 110 may generate the first packet 800 by inserting the path information into the packet based on the generated link setting information.

According to an embodiment of the present disclosure, the first device 110 may generate a rule of inserting the path information into the packet using the generated link setting information. The rule of inserting path information is defined as a method of inserting path information into the packet so that the first device 110 may communicate with the destination device 130 through the selected path. For example, the first device 110 may generate a rule of inserting index information generated in a source port of the packet header and inserting address information of the second device in a destination port of the packet header so that the generated packet may use the second link 160. The first device 110 may generate the first packet 800 according to the rule.

According to an embodiment of the present disclosure, the first device 110 may transmit the first packet 800 through the connected router 140. The address information of the second device 120 has been inserted in a destination port of the first packet 800 transmitted by the first device 110, and thus the router 140, which has received the first packet 800, may transmit the first packet 800 to the second device 120.

According to an embodiment of the present disclosure, the second device 120 may determine whether the received packet passes through the second device based on the path information included in the received packet. For example, if index information is included in the packet received by the second device 120, the second device 120 may determine the received packet as the first packet 800 which is transmitted to the destination device 130 via the second device 120 according to the path selected by the first device 110.

According to an embodiment of the present disclosure, the second device 120 may generate the second packet 900, as illustrated in FIG. 9, by changing the path information included in the packet according to the link setting information indicated by the index information of the received packet. Furthermore, the second device 120 may generate a rule of changing path information included in the packet using the link setting information. The rule of changing path information is defined as a method of changing path information of the packet so that the first device 110 may communicate with the destination device 130 through the selected path. For example, the second device 120 may generate a rule of inserting the address information of the second device into a source port of the packet header and inserting the address information of the destination device 130 into a destination port of the packet header. The second device 120 may generate the second packet 900 by changing the path information included in the packet according to the generated rule.

According to an embodiment of the present disclosure, the second device 120 may transmit the second packet 900 to the destination device 130 through the link selected by the first device 110. For example, the second device may transmit the generated second packet to the destination device 130 through the second link which is determined as the quickest by the first device 110.

According to an embodiment of the present disclosure, the second device 120 may receive a response packet to the transmitted second packet 900 from the destination device 130.

According to an embodiment of the present disclosure, if a response packet to the second packet is received, the second device 120 may determine that the actual destination of the response packet is not the second device 120, but the first device 110. Hence, the third packet 1000, as illustrated in FIG. 10, including address information of the first device 110 may be generated to be transmitted to the first device 110. Furthermore, the second device 120 may generate a rule of changing path information included in the response packet using the link setting information. For example, the second device 120 may generate a rule of inserting address information of the destination device 130 into a source port of the response packet header and inserting address information of the first device 110 into a destination port of the packet header. The second device 120 may generate the third packet 1000 by changing the path information included in the response packet according to the generated rule.

According to an embodiment of the present disclosure, the second device 120 may transmit the third packet 1000 through the connected router 140. The address information of the first device has been inserted into a destination port of the third packet 1000 transmitted by the second device 120, and thus the router 140, which has received the third packet 1000, may transmit the third packet 1000 to the first device 110.

Some embodiments may be implemented in a form of a non-transitory computer-readable recording medium including a command executable by a computer such as a program module executed by a computer. The non-transitory computer-readable medium may be an arbitrary available medium accessible by a computer, and includes all of a volatile and nonvolatile medium and a separable and non-separable medium. Furthermore, the non-transitory computer-readable medium may include all of a computer storage medium and a communication medium. The computer storage medium includes all of a volatile and nonvolatile medium and a separable and non-separable medium which are implemented in an arbitrary method or technology for storing information such as a computer-readable command, a data structure, program module and other data. The communication medium typically includes a computer-readable command, a data structure, a program module, other data of modulated data signals, or other transmission mechanisms, and includes an arbitrary information transmission medium.

The above description is for illustration and one of ordinary skill in the art can easily change the embodiments into other specific forms without changing the technical concepts and essential features of the present disclosure. Hence, It should be understood that the various embodiments described therein should be considered in a descriptive sense only and not for purposes of limitation. For example, each singular component described therein may also be performed after being distributed. Likewise, components which have been described as having been distributed may also be performed in a combined form.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of communication by a first device, the method comprising:
  selecting, by the first device, a first network path of a plurality of network paths between the first device and a destination device, the first network path being selected based on information of available links;
  generating link setting information corresponding to the first network path between the first device and the destination device through a second device, the link setting information comprising:
    address information of the first device,
    address information of the second device, and
    address information of the destination device;
  generating a first packet based on the link setting information, the first packet comprising:
    a packet source header comprising index information which indicates that the first packet passes the second device which receives the first packet and includes the address information of the destination device included in the link setting information, and a packet destination header comprising the address information of the second device; and transmitting the first packet to the destination device through the second device, wherein the generating of the link setting information comprises generating the index information.

2. The method of claim 1, wherein the generating of the first packet comprises:

generating a rule for inserting first network path information into the packet based on the link setting information; and generating the first packet by inserting the first network path information into the packet according to the generated rule.

3. The method of claim 1, wherein the selecting the first network path comprises selecting a network path including a quickest combination of links between the first device and the second device, from among a plurality of available combinations of links between the first device and the destination device, based on information of the available links.

4. The method of claim 1, wherein the link setting information further comprises at least one of port information of the destination device, port information of the first device, and setting information for a transmission control protocol/internet protocol (TCP/IP) of the first device and the destination device.

5. A first device which communicates through a second device, the first device comprising:

a first packet processor configured to:
   select a first network path of a plurality of network paths between the first device and a destination device, the first network path being selected based on information of available links,
   generate link setting information corresponding to the first network path between the first device and the destination device through the second device, the link setting information comprising:
      address information of the first device,
      address information of the second device, and
      address information of the destination device,
   generate a first packet based on the link setting information, the first packet comprising:
      a packet source header comprising index information which indicates that the first packet passes the second device which receives the first packet and includes the address information of the destination device included in the link setting information, and
      a packet destination header comprising the address information of the second device; and a first transceiver configured to transmit the first packet to the destination device through the second device, wherein the first packet processor is further configured to generate the index information.

6. The apparatus of claim 5, wherein the first packet processor is further configured to:

generate a rule for inserting first network path information into the packet based on the link setting information, and generate the first packet by inserting the first network path information into the packet according to the generated rule.

7. The apparatus of claim 5, wherein the first packet processor is further configured to select a network path as the first network path including a quickest combination of links between the first device and the second device, from among a plurality of available combination of links between the first device and the destination device, based on a state of the available links.

8. A method of communication by a second device, the method comprising:

receiving, by the second device, a first packet from a first device;

determining whether a first packet source header of the first packet includes an index information which indicates that the first packet passes the second device and includes address information of a destination device;

generating, when the received first packet includes the index information, a second packet comprising:
   a packet source header comprising address information of the second device, and
   a packet destination header comprising the address information of the destination device; and transmitting the second packet to the destination device.

9. The method of claim 8, wherein the generating of the second packet comprises:

generating a rule for changing path information included in the first packet, based on link setting information included in the first packet; and changing the path information included in the first packet according to the generated rule.

10. The method of claim 9, wherein the link setting information comprises address information of the first device and address information of the second device, the method further comprising:

receiving a response packet in response to the transmitted second packet;

generating a third packet comprising:
   a packet source header comprising address information of the destination device, and
   a packet destination header comprising the address information of the first device; and transmitting the third packet to the first device.

11. The method of claim 10, wherein the generating of the third packet comprises:

generating a rule for changing path information included in the response packet, based on the link setting information; and generating the third packet by changing the path information included in the response packet based on the generated rule.

12. A second device, comprising:

a second receiver configured to receive a first packet from a first device;

a second packet processor configured to:
   determine whether a first packet source header of the first packet includes an index information which indicates that the first packet passes the second device and includes address information of a destination device, and
   generate, when the received first packet includes the index information, a second packet comprising:
      a packet source header comprising address information of the second device, and
      a packet destination header comprising the address information of the destination device; and a second transceiver configured to transmit the second packet to the destination device.

13. The apparatus of claim 12, wherein the second packet processor is further configured to:

generate a rule for generating the second packet based on link setting information included in the first packet, and generate the second packet by changing path information included in the received first packet according to the generated rule.

14. The apparatus of claim 13,
wherein the link setting information comprises address information of the first device and address information of the second device,
wherein the second receiver is further configured to receive a response packet in response to the transmitted second packet,
wherein the second packet processor is further configured to generate, when the received first packet includes index information to the address information of the destination device, a third packet comprising:
  a packet source header comprising address information of the destination device, and
  a packet destination header comprising the address information of the first device, and
wherein the second transceiver is further configured to transmit the third packet to the first device.

15. The apparatus of claim 14, wherein the second packet processor is further configured to:
  generate a rule for changing path information included in the response packet, based on the link setting information, and
  generate the third packet by changing the path information included in the response packet based on the generated rule.

16. A non-transitory computer-readable storage medium storing instructions that, when executed, cause at least one processor to perform the method of claim 1.

* * * * *